J. B. O'BRIEN.
PLANTER ATTACHMENT.
APPLICATION FILED JUNE 20, 1908.
901,552.
Patented Oct. 20, 1908.
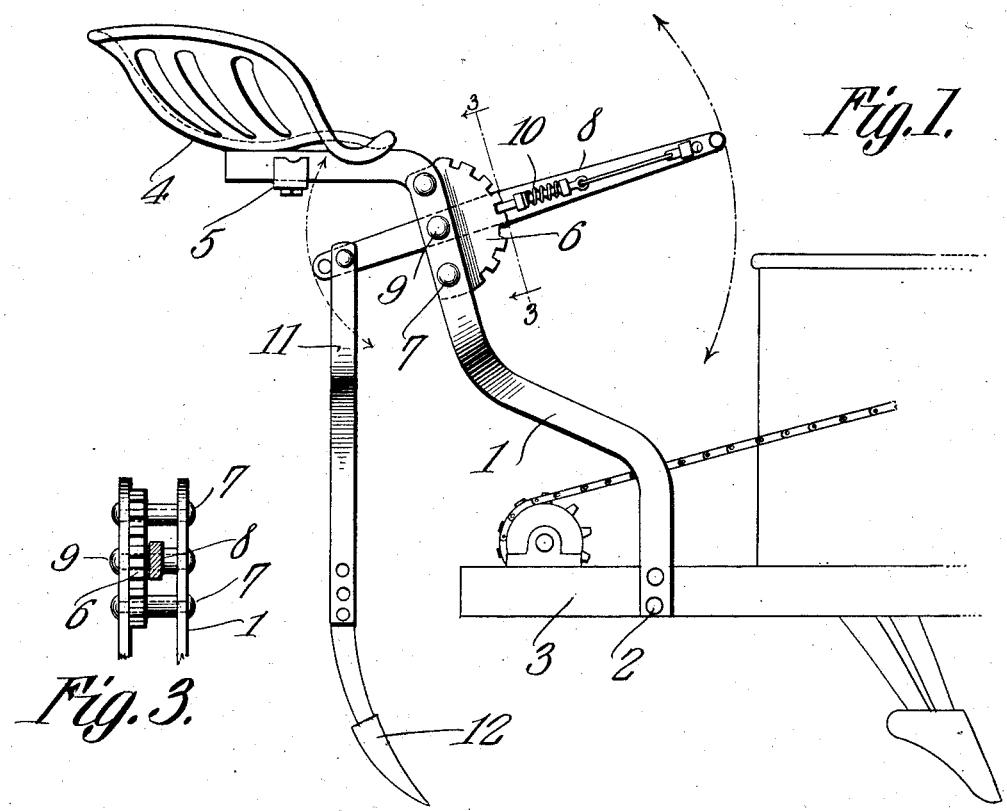
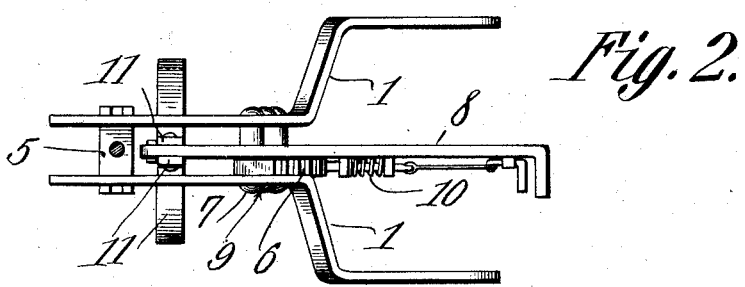
Witnesses
Inventor
John B. O'Brien.
By C. A. Snow & Co.
Attorneys
THE NORRIS PETERS CO., WASHINGTON, D. C.

UNITED STATES PATENT OFFICE.

JOHN B. O'BRIEN, OF SANTA ANNA, TEXAS.

PLANTER ATTACHMENT.

No. 901,552.  Specification of Letters Patent.  Patented Oct. 20, 1908.

Application filed June 20, 1908. Serial No. 439,639.

*To all whom it may concern:*

Be it known that I, JOHN B. O'BRIEN, a citizen of the United States, residing at Santa Anna, in the county of Coleman and State of Texas, have invented a new and useful Planter Attachment, of which the following is a specification.

This invention has relation to the planter attachments and it consists in the novel construction and arrangement of its parts as hereinafter shown and described.

The object of the invention is to provide an attachment for a planter which is in the form of a seat support and which is provided with an adjustable lever mechanism which carries at its working end a series of standards upon which are mounted covering plows. By providing such arrangement an operator who occupies the seat may manipulate the lever whereby the plows which perform the covering of the seed in the furrow may be adjusted so as to operate at any desired depth below the surface of the soil.

In the accompanying drawing Figure 1 is a side elevation of a planter having the attachment applied thereto. Fig. 2 is a top view of the attachment and Fig. 3 is a front view of a portion of the attachment.

The attachment consists of the seat posts 1 which are adapted to be bolted or otherwise secured as at 2 to the beams 3 of a planter. The seat posts are brought toward each other at their upper ends and the seat 4 is mounted upon the upper end portions of the said posts and may be adjusted along the same and is secured in an adjusted position by means of a clamping plate 5. The gear segment 6 is attached to one of the posts 1 and is held in such position by means of the bolts 7 which pass transversely through the said gear segment and both of the posts 1. The lever 8 is fulcrumed upon the bolt 9 which also passes transversely through the gear segment 6 and the post 1—1 and the pawl mechanism 10 is mounted upon the said lever and is adapted to engage the teeth of the gear segment 6. The standards 11 are pivotally and adjustably attached at their upper ends to the working end of the lever 8 and the covering plows 12 are adjustably attached to the lower ends of the said standards 11. The forward end of the lever 8 is forwardly disposed with relation to the seat 4 and is in convenient reach of one occupying the seat.

The operation of the invention is as follows: The seat posts 1 are attached to the planter beams 3 as above described and the operator occupies the seat 4. As the planter is drawn along the field in performing its work the operator may grasp the lever 8 and adjust it so that the covering plows 12 may be forced to operate at a greater or less distance below the surface of the soil. Thus the seed deposited in the furrow which is opened by the ordinary furrow opener of the said planter, may be covered by a thin or thick layer of soil as desired.

Having thus described my invention what I claim as new and desire to secure by Letters Patent, is:—

1. A planter attachment comprising seat posts adapted to be attached to the frame work of the planter, a gear segment mounted upon the posts, a seat carried by the upper portions of the posts, a lever fulcrumed between the posts and having a pawl adapted to engage the gear segment, standards attached to the lever and plows carried by the standards.

2. An attachment as described comprising seat posts adapted to be attached to the frame work of an implement, a seat adjustably mounted upon the upper end portions of the posts, a gear segment attached to the posts and being located between the same, a lever fulcrumed between the posts having a pawl adapted to engage the segment, standards pivotally connected with the working end of the lever and plows carried by said standards.

3. An attachment as described comprising posts having means for an attachment with the frame of an implement, a seat mounted upon the upper portions of the seat posts, a gear segment located between the posts and being fixed with relation to the same, a lever fulcrumed between the posts and having a pawl adapted to engage said segment, standards adjustably and pivotally connected with the working end of said lever and plows carried by said standards.

In testimony that I claim the foregoing as my own, I have hereto affixed my signature in the presence of two witnesses.

JOHN B. O'BRIEN.

Witnesses:
J. SCOTT,
W. B. HOLLAND.